(12) United States Patent
Rao et al.

(10) Patent No.: US 9,191,310 B2
(45) Date of Patent: Nov. 17, 2015

(54) NETWORK INTERCONNECTION OVER A CORE NETWORK

(71) Applicants: Dhananjaya Rao, Milpitas, CA (US); Victor M. Moreno, Carlsbad, CA (US); Sameer D. Merchant, San Jose, CA (US); Hasmit S. Grover, Fremont, CA (US)

(72) Inventors: Dhananjaya Rao, Milpitas, CA (US); Victor M. Moreno, Carlsbad, CA (US); Sameer D. Merchant, San Jose, CA (US); Hasmit S. Grover, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 13/764,500

(22) Filed: Feb. 11, 2013

(65) Prior Publication Data
US 2014/0226652 A1 Aug. 14, 2014

(51) Int. Cl.
*H04L 12/28* (2006.01)
*H04L 12/741* (2013.01)
*H04L 12/715* (2013.01)

(52) U.S. Cl.
CPC ............... *H04L 45/54* (2013.01); *H04L 45/04* (2013.01)

(58) Field of Classification Search
USPC .................................. 370/389, 400
See application file for complete search history.

(56) References Cited

U.S. PATENT DOCUMENTS

| | | | |
|---|---|---|---|
| 2009/0080352 A1* | 3/2009 | Yoneda | 370/312 |
| 2011/0236018 A1* | 9/2011 | Valiveti et al. | 398/45 |
| 2012/0014387 A1* | 1/2012 | Dunbar et al. | 370/395.53 |
| 2014/0051485 A1* | 2/2014 | Wang et al. | 455/574 |

OTHER PUBLICATIONS

Ali Sajassi, et al., PBB E-VPN draft-ietf-l2vpn-pbb-evpn-01, Internet Working Group, Internet Draft, Category: Standards Track, http://tools.ietf.org/html/draft-ietf-l2vpn-pbb-evpn-01, 25 pages, Mar. 9, 2012.
Ali Sajassi, et al., PBB E-VPN draft-ietf-l2vpn-pbb-evpn-02, Internet Working Group, Internet Draft, Category: Standards Track, http://tools.ietf.org/html/draft-ietf-l2vpn-pbb-evpn-02, 27 pages, Mar. 29, 2012.

* cited by examiner

*Primary Examiner* — Frank Duong
*Assistant Examiner* — Feben M Haile
(74) *Attorney, Agent, or Firm* — Baker Botts L.L.P.

(57) ABSTRACT

According to one embodiment, a method includes receiving, by a first edge device at a first site, a first site overlay control plane message including control plane information. The first edge device translates the first site overlay control plane message into a core overlay control plane message. The first edge device sends the core overlay control plane message over a core network to a second edge device at a second site.

9 Claims, 4 Drawing Sheets

NETWORK INTERCONNECTION OVER A CORE NETWORK

TECHNICAL FIELD

The present invention relates generally to the field of telecommunications networks and more particularly to network interconnection over a core network.

BACKGROUND

Conventional network communications may involve data plane and control plane communications. The control plane typically involves communications that inform how devices should operate, such as how data plane communications should be handled. Various control plane protocols exist for communicating control plane information within networks.

An Overlay Transport Virtualization (OTV) protocol has been developed to interconnect separate Layer 2 networks over a Layer 3 core. The OTV protocol uses a "MAC-in-Internet Protocol (IP)" encapsulation technique to communicate Layer 2 data plane messages over an IP network. While existing devices in a Layer 2 network can learn about remote device reachability in the data plane, conventional techniques may create scalability problems.

Furthermore, conversational MAC learning methods have been developed whereby devices within the same network may learn only the MAC addresses for interested devices, rather than all MAC addresses in the domain. Using such techniques, each interface learns only those MAC addresses that are actively speaking with the interface.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF EXAMPLE EMBODIMENTS

Overview

According to one embodiment, a method includes receiving, by a first edge device at a first site, a first site overlay control plane message including control plane information. The first edge device translates the first site overlay control plane message into a core overlay control plane message. The first edge device sends the core overlay control plane message over a core network to a second edge device at a second site.

According to another embodiment, a method includes receiving, by a first edge device at a first site, a core overlay control plane message including device ID information from a second edge device at a second site over a core network. The first edge device stores the device ID information in an edge device memory. The first edge device generates a device ID seed for a first switch device at the first site, the device ID seed being used to generate a device ID that is unique across the first site and one or more remote sites.

Certain embodiments of the disclosure may provide one or more technical advantages. A technical advantage of one embodiment is that scalability may be improved since an edge device may not store MAC address information in MAC address tables for all devices from which the edge device receives data plane messages. Another technical advantage of one embodiment is that conversational learning techniques may be applied between remote sites interconnected by a core network without extending the domain across the sites. Another technical advantage of one embodiment is that fine-grained load balancing, fine-grained traffic replication, traffic filtering, and/or traffic pruning may be improved. Another technical advantage of one embodiment is that an edge device may utilize multicast control plane information in conjunction with information contained in data plane messages, such as inner VLANs or groups, to prune and route data plane traffic from remote sites without extending the domain across the sites.

Certain embodiments of the disclosure may include none, some, or all of the above technical advantages. One or more other technical advantages may be readily apparent to one skilled in the art from the figures, descriptions, and claims included herein.

Example Embodiments

Figure 1:
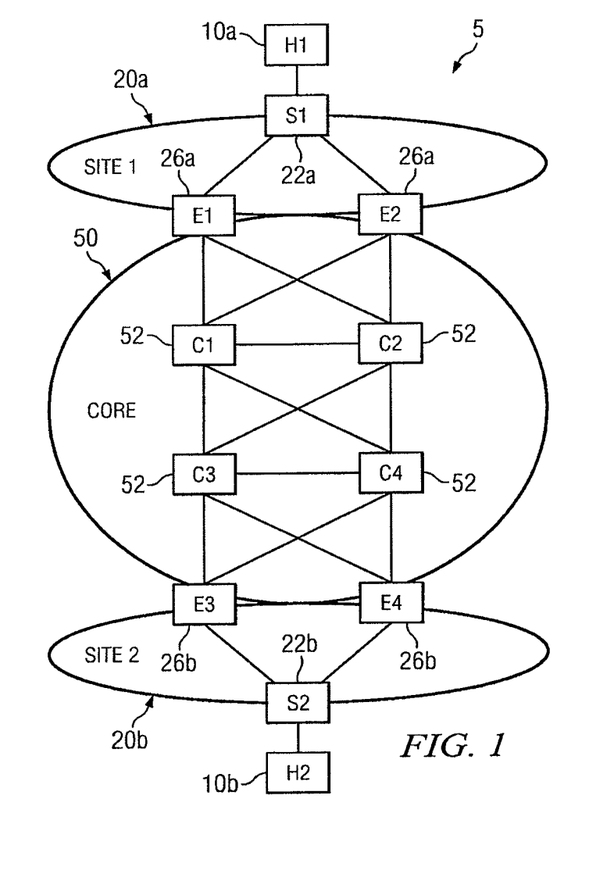
FIG. 1 illustrates an example network environment.

FIG. 1 illustrates an example network environment 5. Network environment 5 may include hosts 10a and 10b, sites 20a and 20b, and core 50. Sites 20a and 20b may be connected by and communicate across core 50. Sites 20a and 20b may be data center sites or any other suitable type of site for housing networking devices. Sites 20a and 20b utilize one or more site overlay protocols, such as IS-IS protocols, data plane protocols, and control plane protocols. Such protocols may be Layer 2 protocols or other suitable types of protocols. Core 50 may be a Layer 3 core, such as an IP core or an MPLS core, or any other suitable type of core network. Control plane information may be communicated across core 50 using one or more core overlay protocols, such as IS-IS protocols, data plane protocols, and control plane protocols. Such protocols may be Layer 3 protocols, Layer 2 protocols, or other suitable types of protocols. In certain embodiments, sites 20a and 20b may communicate via an overlay transport virtualization protocol that extends Layer 2 network connectivity over Layer 3 network connectivity. As shown in FIG. 1, site 20a may include switch 22a and edge devices 26a, site 20b may include switch 22b and edge devices 26b, and core 50 may include one or more core switches 52. In other embodiments, sites 20a and 20b and core 50 may contain different types, numbers, organizations, and interconnections of devices.

As used herein, "site overlay control plane" refers to any control plane used to facilitate the communication of control plane information between devices within a site. Site overlay control planes may also facilitate communication of control plane information between devices at different sites. Sites may be data center sites or any other suitable site at which network devices can be located. A site overlay control plane may be a Layer 2 control plane, a hybrid control plane that implement features of Layer 2 and one or more other layers (such as Layer 3), or any other suitable type of control plane.

As used herein, "core overlay control plane" refers to any control plane used to facilitate the communication of control plane information across a core network. A core overlay control plane may be a Layer 3 control plane, a Layer 2 control plane, a hybrid control plane that implements features of multiple Layers, or any other suitable type of control plane.

As shown in FIG. 1, host 10a may be connected to switch 22a. Certain embodiments may include a single host 10a, while other embodiments may include multiple hosts connected to switch 22a and/or additional switches. While FIG. 1 shows host 10a connected to a single switch 22a, in other embodiments host 10a may be connected to multiple switches 22a. As shown in FIG. 1, switch 22a may be connected to edge devices 26a. However, in other embodiments switch 22a may be connected to a single edge device 26a or three or more edge devices 26a. Various devices in site 20a may communicate with each other using one or more site overlay protocols, such as IS-IS protocols, data plane protocols, and control plane protocols. Such protocols may be Layer 2 protocols or other suitable types of protocols. Edge devices 26a may communicate with devices in one or more remote sites, such as site 20b, using one or more core overlay protocols, such as IS-IS protocols, control plane protocols, data plane protocols, and IP protocols. Such protocols may be Layer 3 protocols or other suitable types of protocols. In certain embodiments, edge devices 26a may be configured to communicate with edge devices in remote sites via an overlay transport virtualization protocol.

As illustrated in FIG. 1, edge devices 26a may be connected to core switches 52. In certain embodiments, edge devices 26a may be connected to a single core switch, while in other embodiments, edge devices 26a may be connected to three or more core switches. Various embodiments may have different numbers of core switches 52, and core switches 52 may have any number of other devices interposed between them. Core switches 52 may have multiple interconnections, as shown in FIG. 1. However, core switches may have more or fewer interconnections. Core switches 52 may also have different configurations from one another and/or may be different types of devices.

As illustrated in FIG. 1, core switches 52 may be connected to edge devices 26b. Edge devices 26b may have any of the configurations and capabilities of edge devices 26a described above. As shown in FIG. 1, edge devices 26b may be connected to switch 22b, which may be connected to host 10b. Switch 22b may have any of the configurations and capabilities of switch 22a described above. In other embodiments, edge devices 26 may be connected to two or more switches 22b, which may in turn be connected to two or more hosts 10b, or a single switch 22b may be connected to multiple hosts 10b.

While FIG. 1 illustrates a particular network environment 5, numerous other combinations and interconnections of devices are possible. Certain embodiments may include additional hosts, sites, and/or cores. Sites 20a and 20b, as well as any additional sites, are capable of having numerous types, interconnections, and configurations of switches and edge devices, and other structures or devices may be interposed between these switches and edge devices. Furthermore, core 50 may have numerous types, interconnections, and configurations of core switches and/or other devices, and other structures or devices may be interposed between these core switches and between these core switches and edge devices 26a and 26b.

Figure 2:
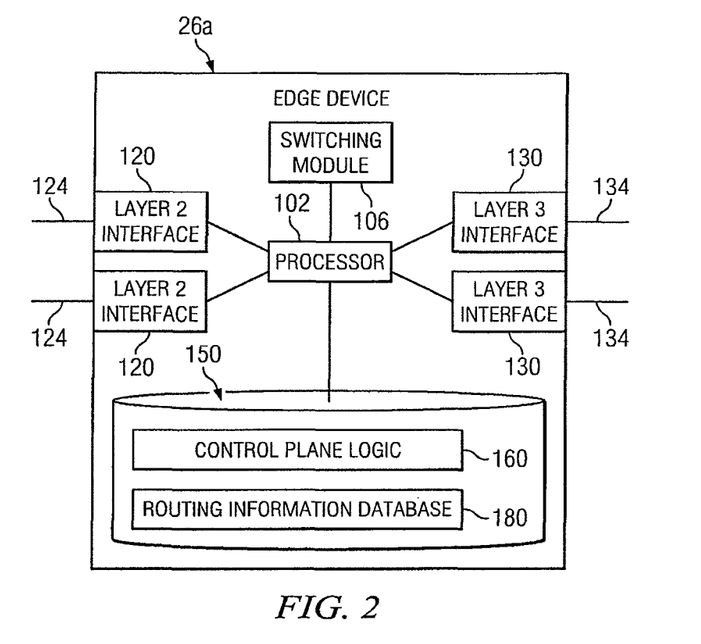
FIG. 2 illustrates an example edge device that may be used in the network environment of FIG. 1.

FIG. 2 illustrates an example edge device 26a that may be used in network environment 5 of FIG. 1. Edge device 26a may have a processor 102, switching module 106, Layer 2 interfaces 120, Layer 3 interfaces 130, and an edge device memory 150. As shown in FIG. 2, Layer 2 interfaces 120 may be connected to a processor 102, which may be connected to switching module 106, edge device memory 150, and Layer 3 interfaces 130. In certain embodiments, the edge device memory 150 may include control plane logic 160 and a routing information database 180.

Layer 2 interfaces 120 may be connected by Layer 2 communication link 124, directly or indirectly, to one or more external devices (not shown in FIG. 2), such as switch 22a, host 10a, or any other device configured to send and/or receive Layer 2 messages. In some embodiments, Layer 2 interfaces 120 may be virtual interfaces sharing a physical interface on the edge device 26a. In alternative embodiments, Layer 2 interfaces 120 may be separate physical interfaces. Layer 2 interfaces 120 may be operative to receive Layer 2 messages from external devices such as servers, switches, edge devices, or other devices configured to send and/or receive Layer 2 messages. Layer 2 interfaces 120 may also be operative to send Layer 2 message to such devices. As shown in FIG. 2, in certain embodiments edge device 26a may have two Layer 2 interfaces 120. However, in alternative embodiments, edge device 26a may have one Layer 2 interface 120 or three or more Layer 2 interfaces 120. Layer 2 interfaces 120 may be operative to send and/or receive Layer 2 messages, such as control plane messages and/or data plane messages. Control plane messages may include control plane information such as unicast control plane information, unknown unicast control plane information, device ID allocation information, multicast control plane information, broadcast control plane information; multicast distribution tree information, load balancing information, VLAN information, or interest group information. In some embodiments, Layer 2 interfaces 120 may be operable to send and receive site overlay messages that facilitate protocols other than Layer 2. Furthermore, in some embodiments, edge device 26a may include one or more additional interfaces to send and receive such site overlay communications, or edge device 26a may include such interfaces in place of Layer 2 interfaces 120.

Layer 3 interfaces 130 may be connected by Layer 3 communication link 134, directly or indirectly, to one or more external devices (not shown in FIG. 2), such as core switches, other core devices, or any other device configured to send and/or receive Layer 3 messages. In some embodiments, Layer 3 interfaces 130 may be virtual interfaces sharing a physical interface on the edge device 26a. In alternative embodiments, Layer 3 interfaces 130 may be separate physical interfaces on edge device 26a. Layer 3 interfaces 130 may be operative to send Layer 3 messages to external devices such as servers, switches, core switches, edge devices, or other devices. Layer 3 interfaces 130 may also be operative to receive Layer 3 messages from such devices. As shown in FIG. 2, in certain embodiments edge device 26a may have two Layer 3 interfaces 130. However, in alternative embodiments, edge device 26a may have one Layer 3 interface 130 or three or more Layer 3 interfaces 130. In some embodiments, Layer 3 interfaces 130 may be operable to send and receive core overlay messages that facilitate protocols other than Layer 3. Furthermore, in some embodiments, edge device 26a may include one or more additional interfaces to send and receive such core overlay communications, or edge device 26a may include such interfaces in place of Layer 3 interfaces 130.

In certain embodiments, Layer 2 interfaces 120 and Layer 3 interfaces 130 may share a single physical interface or device. For example, in some embodiments, each interface may be a separate network card, such as an ethernet card, while in other embodiments, each interface may share a single network card.

Processor 102 may be a microprocessor, microcontroller, or other data processor. As shown in FIG. 2, processor 102 may be connected to switching module 106, which may include digital logic and/or circuitry or other switching hardware configured to perform switching and/or forwarding operations. As seen in FIG. 2, processor 102 may also be connected to edge device memory 150, which may include long-term memory and/or short-term memory, such as read only memory (ROM), random access memory (RAM), magnetic disk drives, solid-state drives, optical storage devices, flash memory devices, network memory devices, electrical, optical, acoustical, and/or other memory storage devices.

Edge device memory 150 may include control plane logic 160. In some embodiments, control plane logic 160 may be hardware-implemented logic, computer readable instructions, or a combination of the two. In some embodiments, control plane logic 160 may be a single process or multiple processes. Control plane logic 160 may be operable to perform site overlay control plane functions, core overlay control plane functions, and/or other functions. For example, in some embodiments, control plane logic 160 may be operable to read control plane information from a received site overlay control plane message and store the control plane information in edge device memory 150, which may include routing information database 180. Edge device memory 150 may also contain various other logic, such as data plane logic.

Control plane logic 160 may be operable to translate a site overlay control plane message into a core overlay control plane message, and/or translate a core overlay control plane message into a site overlay control plane message. Such translation may allow edge device 26a to redistribute information between site overlay and core overlay protocols. For example, this translation may facilitate the redistribution of control plane information between Layer 2 and Layer 3 protocols. This functionality allows edge devices to facilitate interconnection between remote sites without having to maintain MAC address information in a MAC address table for each device in a remote site, which may provide improved scalability.

Control plane logic 160 may translate a site overlay control plane message into a core overlay control plane message by reading control plane information from a received site overlay control plane message and generating a new core overlay control plane message from the control plane information. In certain embodiments, this translation may occur on the fly without storing the control plane information in edge device memory 150. Control plane information may be stored in edge device memory 150. In certain embodiments, control plane information may be stored in routing information database 180, which may contain one or more tables. Control plane information may be stored in a single table in a single database, multiple tables in a single database, in multiple databases, or in any other data-organization scheme in place of or in addition to one or more databases.

Edge device memory 150 may be configured to store control plane information for unicast, unknown unicast, multicast, broadcast, or any other type of traffic. Furthermore, edge device memory 150 may be a single memory device or multiple memory devices, and in embodiments containing multiple memory devices, control plane information may be stored in any of the multiple memory devices and may be duplicated across such devices. For example, in some embodiments, control plane information may be cached in a separate memory cache.

Control plane logic 160 may use the information stored in routing information database 180 to generate one or more control plane messages in response to an event in order to redistribute site overlay protocol information into a core overlay protocol. For example, control plane logic 160 may generate a core overlay control plane message from control plane information stored in routing information database 180. In some embodiments, generation of a core overlay control plane message may occur in response to receiving a site overlay control plane message. Generation of a core overlay control plane message may occur upon receiving each site overlay control plane message, upon storing control plane information, and/or upon updating control plane information. Furthermore, in certain embodiments, generation of a core overlay control plane message may occur as part of a batching process. For example, edge device 26a may receive multiple site overlay control plane messages over a certain period of time, storing control plane information from the site overlay control plane messages in routing information database 180, and after a certain period of time, or after receiving a certain number of control plane messages, edge device 26a may generate one or more core overlay control plane messages from the stored control plane information. In some embodiments, control plane logic 160 may provide an indication of which parts of routing information database 180 have been updated, such as by setting a flag or otherwise signaling that new control plane information has been added or that one or more entries in routing information database 180 have been updated.

In certain embodiments, control plane logic 160 may also be operative to generate and send site overlay and/or core overlay control plane messages in response to an event. Such events may include connection of a new device to network environment 5, rebooting a device, assigning a device ID to a device, changing configuration of a device, receiving a site overlay control plane message, receiving a core overlay control plane message, storing control plane information, expiration of a particular amount of time, user input at an administration interface, or other events effecting the state of edge device 26a or other devices in network environment 5.

In certain embodiments, control plane logic 160 may be a single process capable of implementing some or all of the functionality described above. In other embodiments, control plane logic 160 may include multiple and/or discrete processes. For example, in certain embodiments, one process may operate to receive site overlay control plane messages and store control plane information while another process operates to generate and send core overlay messages.

Figure 3A:
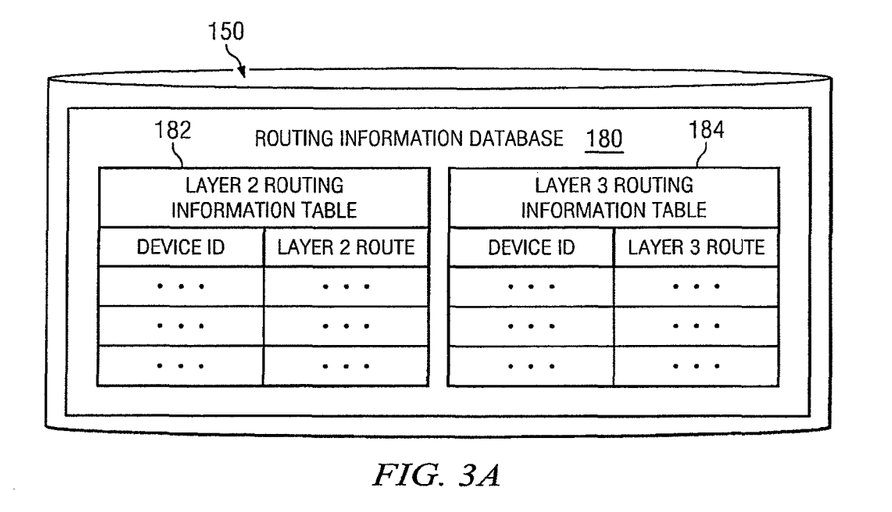
FIG. 3A illustrates an example edge device memory that may be used to store information in the edge device of FIG. 2.
Figure 3B:
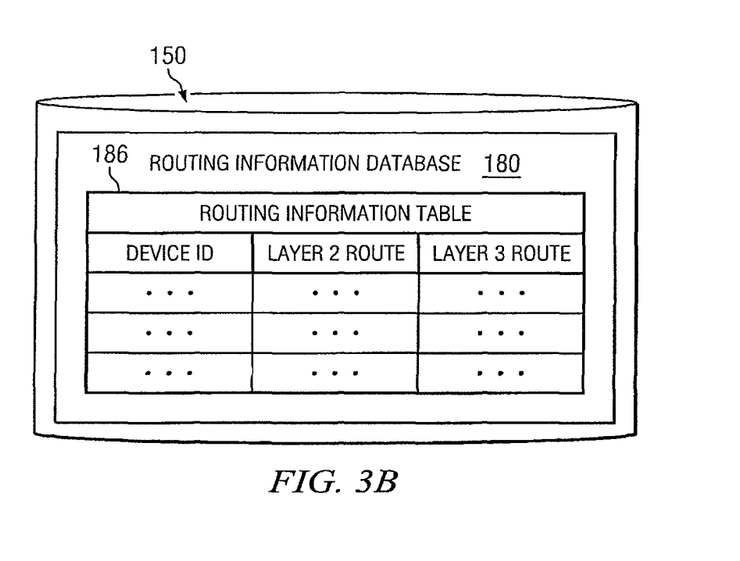
FIG. 3B illustrates another example edge device memory that may be used to store information in the edge device of FIG. 2.

FIGS. 3A and 3B illustrate two example configurations of routing information database 180 from FIG. 2. FIG. 3A illustrates an example edge device memory 150 including routing information database 180, which may include Layer 2 Routing Information Table 182 and Layer 3 Routing Information Table 184. Layer 2 Routing Information Table 182 may include device ID information and Layer 2 route information. Layer 3 Routing Information Table 186 may include device ID information and Layer 3 route information. Device ID information may be device IDs associated with local and/or remote devices. Layer 2 route information may be Layer 2 interface information indicating which Layer 2 interface is associated with a particular device ID: Layer 3 route information may be Layer 3 interface information indicating which Layer 3 interface is associated with a particular device ID. For example, in some embodiments, Layer 3 route information may be an IP address, an IP address and port number, or another type of information. However, different embodiments may store information in various ways. For example, different embodiments may use different numbers, types, and organizations of tables and databases. Furthermore, other embodiments may store control plane information in other types of data structures instead of or in addition to databases. For example, certain control plane information may be stored in a tree structure. Furthermore, while FIGS. 3A and 3B illustrate Layer 2 and Layer 3 routing information, routing information database 180 may store control plane information for site overlay control planes that are not strictly Layer 2 control planes and for core overlay control planes that are not strictly Layer 3 control planes.

FIG. 3B illustrates another example edge device memory 150 having routing information database 180, which may include Routing Information Table 186. As shown in FIG. 3B, Routing Information Table 186 may include device ID information, Layer 2 route information, and Layer 3 route information. These pieces of information may have the same meaning as described above with respect to FIG. 3A.

While FIGS. 3A and 3B show two example routing information databases 180, other embodiments may have differently configured routing information databases 180 or other data structures for storing control plane information. For example, some embodiments may include a routing information database 180 for storing device ID information and route information, wherein the route information may be Layer 2 route information or Layer 3 route information. This may allow edge device 26a to look up route information in a single table upon receiving a data plane message, and the route information may implicitly indicate whether the route is a Layer 2 route or a Layer 3 route.

Figure 4:
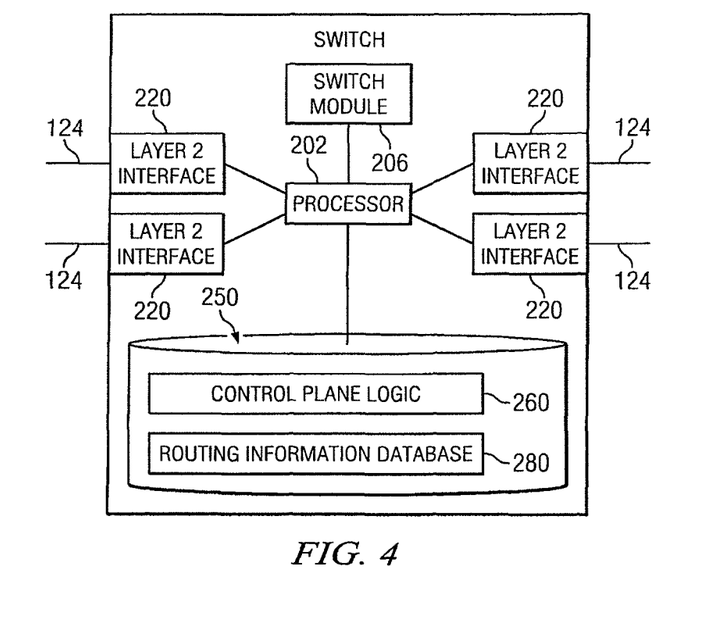
FIG. 4 illustrates an example switch that may be used in the network environment of FIG. 1.

FIG. 4 illustrates an example switch 22a from FIG. 1 having a processor 202, switching module 206, Layer 2 interfaces 220, and a switch memory 250. As shown in FIG. 4, Layer 2 interfaces 220 may be connected to a processor 202, which may be connected to switching module 206, and switch memory 250. In certain embodiments, switch memory 250 may include Layer 2 logic 260 and a routing information database 280.

Layer 2 interfaces 220 may be connected via Layer 2 communication link 124 to one or more external devices (not shown in FIG. 4), such as host 10a, edge device 26a, or any other device configured to send and/or receive Layer 2 messages. In some embodiments, Layer 2 interfaces 220 may be virtual interfaces sharing a physical interface. In other embodiments, Layer 2 interfaces 220 may be separate physical interfaces. Layer 2 interfaces 220 may be operative to send and/or receive Layer 2 messages to or from external devices such as clients, servers, switches, edge devices, or other devices configured to send and/or receive Layer 2 messages. In certain embodiments switch 22a may have multiple Layer 2 interfaces 220. However, in other embodiments, switch 22a may have any number of Layer 2 interfaces 220. For example, in some embodiments, switch 22a may have one Layer 2 interface 220, and in other embodiments, switch 22a may have three or more Layer 2 interfaces 220. Layer 2 interfaces 220 may be operable to send and/or receive different types of Layer 2 messages, such as control plane messages and/or data plane messages.

Processor 202 may be a microprocessor, microcontroller, or other data processor. As shown in FIG. 4, processor 202 may be connected to switching module 206, which may include digital logic and/or circuitry or other switching hardware configured to perform switching and/or forwarding operations. Processor 202 may also be connected to switch memory 250, which may include long-term memory and/or short-term memory, such as read only memory (ROM), random access memory (RAM), magnetic disk drives, solid-state drives, optical storage devices, flash memory devices, network memory devices, electrical, optical, acoustical, or other memory storage devices.

Switch memory 250 may include control plane logic 260. Control plane logic 260 may be a single process or multiple processes, and any such processes may reside in different memory devices. In some embodiments, control plane logic 260 may be hardware-implemented logic, computer readable instructions, or a combination of the two. Control plane logic 260 may be operable to perform Layer 2 control plane functions, such as routing a Layer 2 control plane message to one or more external devices via one or more Layer 2 interfaces 220, storing control plane information contained in a Layer 2 control plane message, and/or other functions. In some embodiments, control plane logic 260 may be operable to read control plane information from a received Layer 2 message and store the control plane information in switch memory 250, which may include routing information database 280. Switch memory 250 may also contain various other logic, such as data plane logic.

In some embodiments, switch memory 250 may be configured to store unicast control plane information, multicast control plane information, broadcast control plain information, and/or any other type of control plane information. This information may be stored in a single table in a single database, multiple tables in a single database, in multiple databases, or in any other data-organization scheme. Furthermore, switch memory 250 may be a single memory device or multiple memory devices, and in embodiments containing multiple memory devices, control plane information may be stored in any of the multiple memory devices and may be duplicated across such devices. For example, in some embodiments, control plane information may be cached in a separate memory cache.

Control plane logic 260 may be configured to generate and send one or more site overlay control plane messages (such as Layer 2 control plane messages) containing control plane information. For example, in certain embodiments, control plane logic 260 may generate a site overlay control plane message in response to an event. Such events may include connecting switch 22a to the network environment 5, rebooting switch 22a, assigning a device ID to switch 22a, changing configuration of switch 22a, receiving a site overlay control plane message, storing control plane information in switch memory 250, expiration of a particular amount of time, or other events effecting the state of switch 22a or other devices in network environment 5. Control plane logic 260 may also be configured to forward received site overlay control plane messages to another device without storing control plane information.

Figure 5:
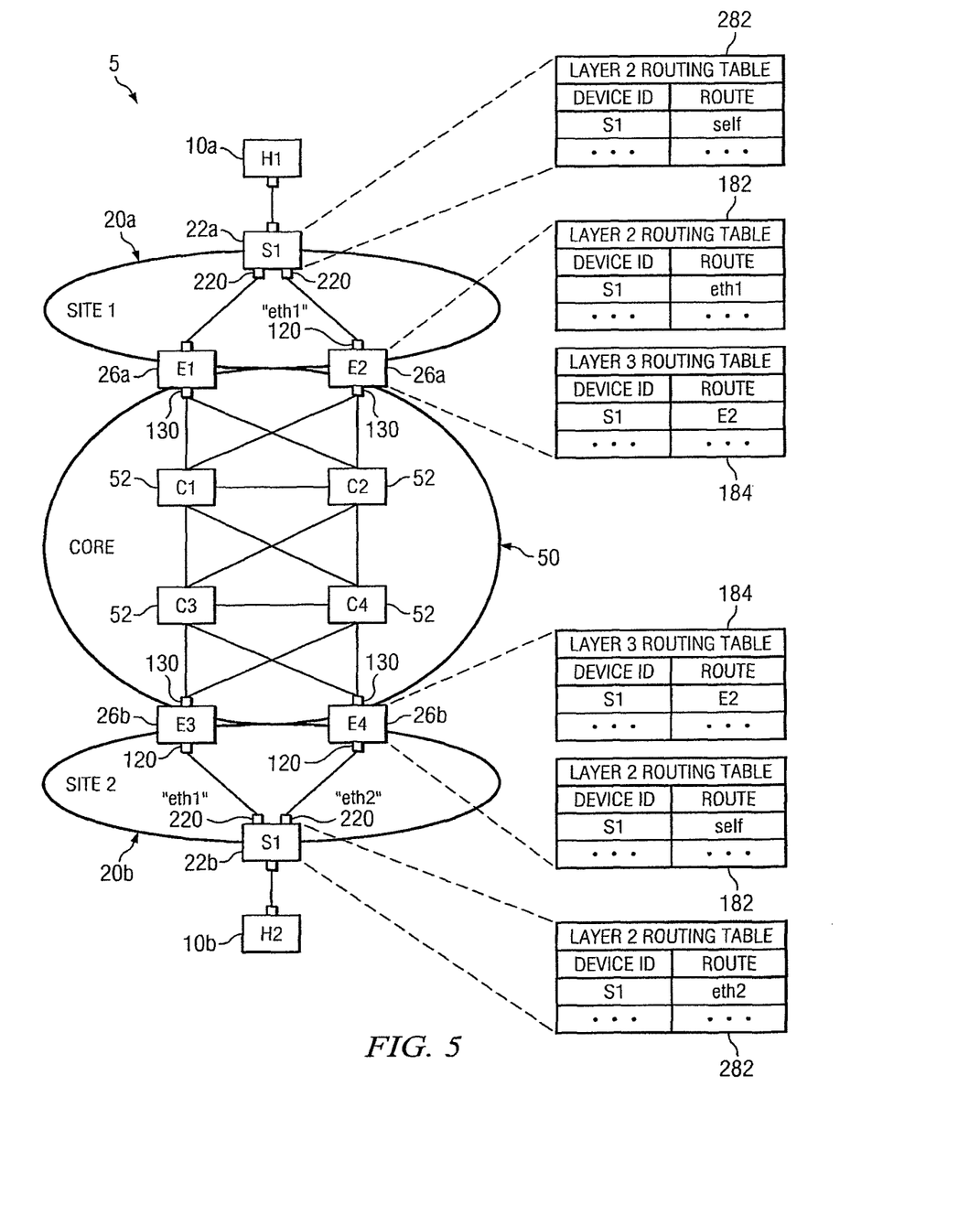
FIG. 5 illustrates an example flow of control plane information through the network environment of FIG. 1.

FIG. 5 shows an example flow of a control plane message through network environment 5 of FIG. 1. FIG. 5 also shows information stored in example routing information databases 180 and 280. The information shown in these tables may be stored by the respective devices as the control plane message is received. The illustrated redistribution of control plane information from a site overlay protocol into a core overlay protocol at edge device 26a, and from a core overlay protocol back into a site overlay protocol at edge device 26b, may allow for communication of control plane information between remote sites across a core network without requiring encapsulation of the site overlay control plane message in one or more core overlay messages. It may also allow for communication of control plane information, such as device reachability information, between remote sites across a core network by means other than data plane communications. This may allow for conversational learning techniques to be applied across multiple remote sites without extending the domains across the sites, which may provide improved scalability. For example, an edge device may store MAC addresses of remote devices in a MAC address table only for interested remote devices, which may provide improved scalability since the size of the MAC address table may not reflect the total number of devices in all interconnected sites.

The example routing information tables shown in FIG. 5 contain control plane information that may be communicated via control plane messages and stored. Switch 22a, which has device ID "S1" in the present example, stores control plane information relating to itself in a Layer 2 routing table 282, which may be part of a routing information database 280 in switch memory 250 (not shown in FIG. 5). As shown in FIG. 5, this may be achieved by storing the device ID "S1" and an indication that this device ID is its own. In other embodiments, switch 22a may not store an entry for itself in Layer 2 Routing Information Table 282. In some embodiments, device IDs may be in MAC address format, while in other embodiments, device IDs may utilize other formats. Device IDs may also different formats from one another.

Switch 22a may advertise its device ID by sending a site overlay control plane message (which may be a Layer 2 control plane message or any other suitable type of control plane message) containing the device ID to edge device 26a, which may receive the message over Layer 2 interface 120 having a Layer 2 interface ID of "eth 1." Edge device 26a may then read the control plane information contained in the site overlay control plane message and store the device ID and a Layer 2 route in Layer 2 routing table 182. For example, edge device 26a may store an entry associating "S1" with "eth 1," as shown in FIG. 5.

Edge device 26a may also redistribute this site overlay control plane information into the core overlay control plane. For example, edge device 26a, which has Layer 3 route information "E2," may store the control plane information and Layer 3 route information in a Layer 3 routing table, associating "S1" with "E2," as shown in FIG. 5. In some embodiments, Layer 3 route information could be a word, number, symbol, IP address, IP address and port number, a "local host" indicator, or any other ID. Furthermore, in some embodiments, the core overlay control plane may not be Layer 3. For example, the core overlay control plane may embody one or more Layer 2 characteristics.

Edge device 26a may then generate a core overlay control plane message containing the control plane information and send that message across core 50 to edge device 26b, which has Layer 3 route information "E4" in the example embodiment shown in FIG. 5. Edge device 26b may then store the control plane information contained in the core overlay control plane message in Layer 3 Routing Information Table 184. For example, edge device 26b may store the device ID "S1" along with the Layer 3 route information "E2" associated with the edge device 26a, which sent the message.

Edge device 26b may also redistribute control plane information back into the site overlay control plane. For example, edge device 26b may store the device ID "S1" along with the Layer 2 route information indicating "self" in a Layer 2 routing table, which may indicate that messages targeted to "S1" should be sent to the route found in the Layer 3 Routing Information Table 184. Edge device 26b may then generate a site overlay control plane message containing device ID "S1" and send the site overlay control plane message over Layer 2 interface 120 to switch 22b. Switch 22b may receive the site overlay control plane message over Layer 2 interface 220, which has a Layer 2 interface ID "eth 2," as shown in FIG. 5. Switch 22b may read control plane information from the site overlay control plane message and store the control plane information in Layer 2 Routing Information Table 282. For example, as shown in FIG. 5, switch 22b may store the device ID "S1" along with the Layer 2 interface ID "eth 2," which may indicate that messages targeted to "S1" should be routed over Layer 2 interface "eth2."

While FIG. 5 illustrates edge devices 26a and 26b having a separate routing table for Layer 2 and Layer 3 information, numerous other embodiments are possible. For example, some embodiments may store both Layer 2 and Layer 3 information in a single table, such as Routing Information Table 186, shown in FIG. 3B. Other embodiments may have a single routing table for Layer 2 and Layer 3 information having only a single column for routing information. Still other embodiments may utilize other types of data structures. For example, switches 22a and 22b and edge devices 26a and 26b may store certain control plane information in tree structures. Furthermore, in some embodiments, different devices in the network environment 5, such as edge device 26a and edge device 26b, may store and/or organize control plane information differently from one another. For example, one or more routing information databases 180 and 280 may have various additional tables for storage of different types of control plane information. In some embodiments, edge device memory 150 and/or switch memory 250 may also store control plane information in separate databases. Furthermore, in certain embodiments, the stored control plane information may be information other than a Layer 2 route or a Layer 3 route.

While the above process describes communication of unicast control plane information, similar processes may be used to convey other types of control plane information. For example, similar methods may be used to communicate multicast control plane information between remote sites. Furthermore, various types of control plane information may be stored in different tables, different databases, or in different types of data structures. In some embodiments, switch devices 22a and 22b and edge devices 26a and 26b may communicate and/or store control plane information relating to multicast distribution trees, load balancing, VLANs, interest groups, other group information, and/or other information relating to multi-destination traffic. Such processes may enable or improve fine-grained load balancing, fine-grained traffic replication, traffic filtering, and/or traffic pruning. In some embodiments, for example, edge devices 26a and 26b may utilize multicast control plane information in conjunction with information contained in data plane messages, such as inner VLANs and groups, to prune and route data plane traffic. Additionally, multi-destination traffic may be load-balanced per VLAN. Multiple device and information configurations are possible as well. For example, in certain embodiments, sites 20a and 20b may have different numbers of multicast distribution trees.

As an example, in a particular embodiment, switch 22a may send a site overlay control plane message containing interest group information to edge device 26a. Edge device 26a may store this local interest group information in edge device memory 150 and redistribute the information into the core overlay control plane, sending a core overlay control plane message to edge device 26b, which may then store the remote interest group information in its own edge device memory 150. In some embodiments, edge device 26b may redistribute the information back into the site overlay control plane of site 20b, translating the core overlay control plane message into a site overlay control plane message, which it may send to switch 22b.

Devices in sites 20a and 20b may be configured to have device IDs that are unique across the interconnected sites, even though the sites may have separate domains. For example, switch 22a may be configured to have a device ID that is unique across site 20*a* and site 20*b*. Such unique device IDs may be beneficial for accurately routing messages in network environments interconnected in the manner described above. In some embodiments, uniqueness may be achieved by one or more administrators manually assigning unique device IDs. In other embodiments, device ID allocation may be directed by one or more edge devices or other devices configured to allocate device IDs. For example, edge device 26*a* may be configured to assign a new device ID to a switch in site 20*a* when the switch is connected to the site.

In certain embodiments, device ID assignment might be achieved by utilizing a device ID seeding process. For example, each interconnected site may have a unique site ID or other ID that is unique among the interconnected sites, and that ID may be used as a seed to generate a new device ID. In some embodiments, the device ID seed may be a statically configured parameter, such as a site ID, IP prefix, or a purpose-built parameter. For example, device ID seeds may be generated based on a site ID configured by a user. In alternative embodiments, the device ID seed may generated dynamically, such as by generating a seed based on knowledge of what device IDs are in use remotely so that the generated device ID will not collide with the device IDs in use at the local site or other interconnected sites. For example, the example process illustrated in FIG. 5 may allow edge device 26*b* to store device IDs in use at sites 20*a* and 20*b*. Edge device 26*b* may then use that stored information to avoid device IDs already in use when generating a new device ID or device ID seed. Remote edge devices may also communicate site ID information, Device ID seed information, or other device ID allocation information.

In certain embodiments, edge devices 26*a* and 26*b* may be configured to execute a conflict resolution process if a non-unique device ID is identified. For example, edge device 26*a* may be configured to block or delay forwarding of some or all traffic from a local device whose device ID has been identified as non-unique until a new device ID has been assigned. Edge device 26*a* may also block or delay sending some or all traffic from site 20*a* to remote sites until all local device ID assignments are unique across the known sites of network environment 5. In other embodiments, edge device 26*a* may be configured to block incoming data traffic from a remote device or site whose ID has been identified as non-unique until the conflict has been resolved. Resolving a device ID conflict or collision may involve generating one or more device ID seeds or device IDs and/or assigning one or more device IDs. Furthermore, in some embodiments, the device ID assignment and conflict resolution procedures may be performed by another device at the site or a remote device.

Various embodiments disclosed herein may be used together in a variety of combinations. For example, network environment 5 may have different numbers and organizations of sites, and those sites may have different types, numbers, and organizations of devices within them. As another example, in certain embodiments, various devices, such as edge device 26*a* and switch 22*a*, may have different arrangements of processors, memory devices, interfaces, switching modules, and other components. For example, in certain embodiments, edge device 26*a* may have multiple and differently configured processors 102, edge device memories 150, switching modules 106, Layer 2 interfaces 120, and/or Layer 3 interfaces 130. As another example, switch 22*a* may have multiple and differently configured processors 202, edge device memories 250, switching modules 206, and/or Layer 2 interfaces 220. As yet another example, switches 22 and edge devices 26 may have interfaces, logic, and/or other components that facilitate communication of information between control planes that are not strictly Layer 2 or Layer 3.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A method comprising:
receiving, by a first edge device at a first site, a first site overlay control plane message including control plane information that comprises a device ID associated with the first switch device, the first edge device including a first Layer 2 network interface operable to receive Layer 2 messages;
translating, by the first edge device, the first site overlay control plane message into a core overlay control plane message without encapsulating the first site overlay control plane message in the core overlay control plane message;
sending, by the first edge device, the core overlay control plane message over a core network to a second edge device at a second site;
wherein translating the first site overlay control plane message into the core overlay control plane message comprises:
storing the control plane information in a routing information data base in a first edge device memory, including storing the device ID and a Layer 2 network interface ID associated with the first Layer 2 network interface;
generating the core overlay control plane message from information stored in the first edge device memory without encapsulating the first site overlay control plane message in the core overlay control plane message;
wherein the routing information database comprises one or more tables configured to allow storage of device ID information, Layer 2 route information, and Layer 3 route information; and
wherein receiving, by the first edge device, the site overlay control plane message comprises receiving the site overlay control plane message at the first Layer 2 network interface.

2. The method of claim 1, further comprising:
receiving, by the second edge device, the core overlay control plane message;
translating, by the second edge device, the core overlay control plane message into a second site overlay control plane message; and
sending, by the second edge device, the second site overlay control plane message to a second switch device in the second site;
wherein the first site overlay control plane message was sent by a first switch device at the first site.

3. The method of claim 1 wherein the control plane information comprises one or more of unicast control plane information, unknown unicast control plane information, device ID allocation information, multicast control plane information, broadcast control plane information; multicast distribution tree information, load balancing information, VLAN information, or interest group information.

4. The method of claim 1 wherein the control plane information comprises device reachability information for the first switch device.

5. The method of claim 4 wherein the device reachability information comprises a device ID for the first switch device.

6. The method of claim 2 wherein translating the core overlay control plane message into the second site overlay control plane message comprises:
    storing the control plane information in a second edge device memory; and
    generating the second site overlay control plane message from information stored in the second edge device memory.

7. The method of claim 1 wherein generating the core overlay control plane message occurs as part of a batching process.

8. One or more non-transitory computer readable storage media encoded with software comprising computer executable instructions and when the software is executed operable to:
    receive a first site overlay control plane message including control plane information that comprises a device ID associated with the first switch device, the first edge device including a first Layer 2 network interface operable to receive Layer 2 messages;
    translate the first site overlay control plane message into a core overlay control plane message without encapsulating the first site overlay control plane message in the core overlay control plane message; and
    send the core overlay control plane message over a core network to an edge device at a remote site;
    wherein translating the first site overlay control plane message into the core overlay control plane message comprises:
        storing the control plane information in a routing information data base in a first edge device memory, including storing the device ID and a Layer 2 network interface ID associated with the first Layer 2 network interface;
        generating the core overlay control plane message from information stored in the first edge device memory without encapsulating the first site overlay control plane message in the core overlay control plane message;
    wherein the routing information database comprises one or more tables configured to allow storage of device ID information, Layer 2 route information, and Layer 3 route information; and
    wherein receiving, by the first edge device, the site overlay control plane message comprises receiving the site overlay control plane message at the first Layer 2 network interface.

9. The one or more non-transitory computer readable storage media of claim 8 further operable when the software is executed to:
    receive a core overlay control plane message including control plane information from the remote edge device;
    translate the core overlay control plane message into a site overlay control plane message; and
    send the site overlay control plane message to a switch device.

* * * * *